United States Patent

Sarkozy

[11] 4,261,724
[45] Apr. 14, 1981

[54] TRIPLE GOB BLOWHEAD OR BAFFLE CONSTRUCTION

[75] Inventor: Francis A. Sarkozy, Granby, Conn.

[73] Assignee: Emhart Industries, Inc., Farmington, Conn.

[21] Appl. No.: 89,215

[22] Filed: Oct. 29, 1979

[51] Int. Cl.³ .............................................. C03B 9/36
[52] U.S. Cl. ...................... 65/260; 65/241; 65/261; 65/323
[58] Field of Search ................ 65/232, 321, 323, 319, 65/260, 241, 261

[56] References Cited

U.S. PATENT DOCUMENTS

| Re. 27,834 | 12/1973 | Dahms | 65/323 X |
|---|---|---|---|
| 3,189,427 | 6/1965 | Schirm | 65/323 X |
| 3,472,642 | 10/1969 | Irwin | 65/261 |
| 3,586,494 | 6/1971 | Mumford | 65/261 X |
| 4,009,019 | 2/1977 | Foster | 65/261 |

Primary Examiner—Arthur D. Kellogg

Attorney, Agent, or Firm—McCormick, Paulding & Huber

[57] ABSTRACT

A glassware forming machine has at least three individual side-by-side molds at both the blow and the blank side of the machine, which molds are upwardly open and adapted to be closed by a blowhead or baffle depending upon which side of the machine (blank or blow) that the molds are at, that is for either forming the final article at the blow side or the preliminary parison at the blank side. Three blowheads are disclosed for use at the blow side of a machine, and are retained in a carrier arm for limited vertical movement in order to accommodate variations in height of the tops of the individual molds. Two links extend laterally through slots in the blowhead retainers, and a bellcrank lever interconnects these links to the carrier itself so that upon closing contact made between one of the three blowheads and its associated mold, downward movement of the other two blowheads will occur thereby equalizing the closing forces between all three blowheads and their associated molds.

7 Claims, 4 Drawing Figures

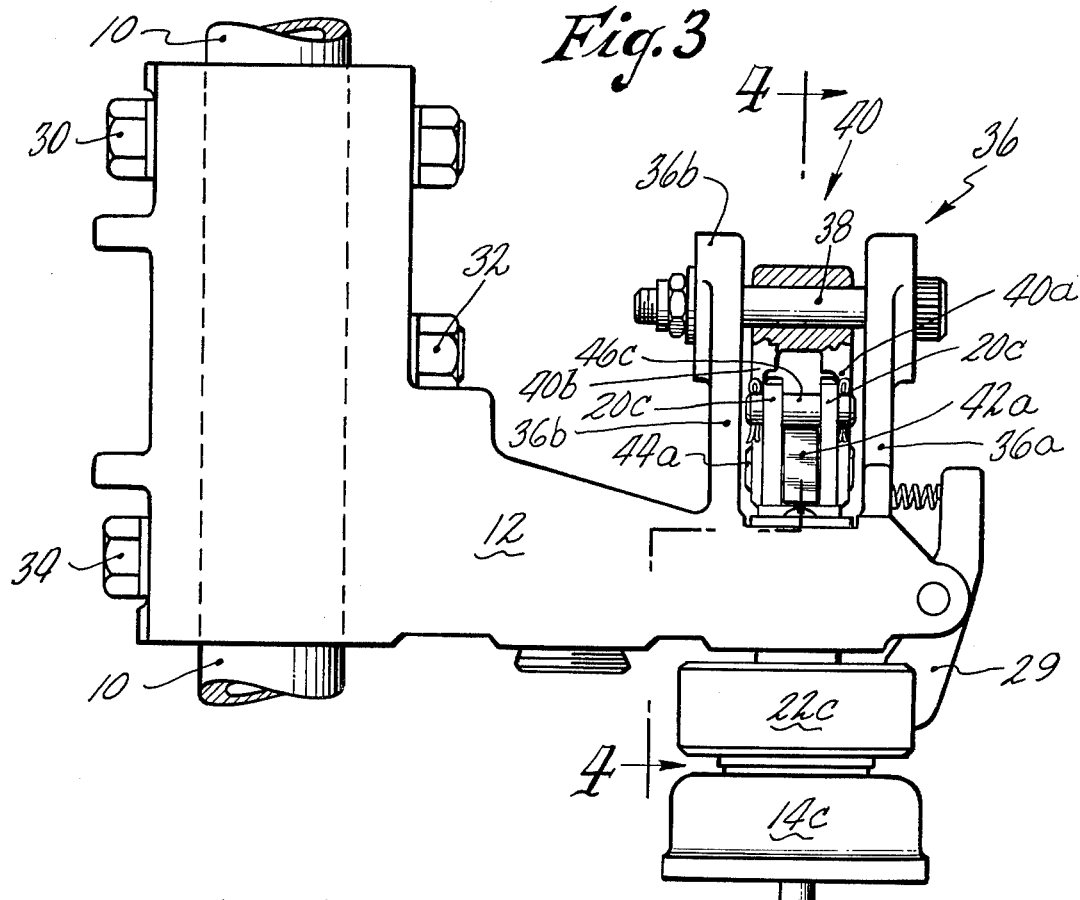
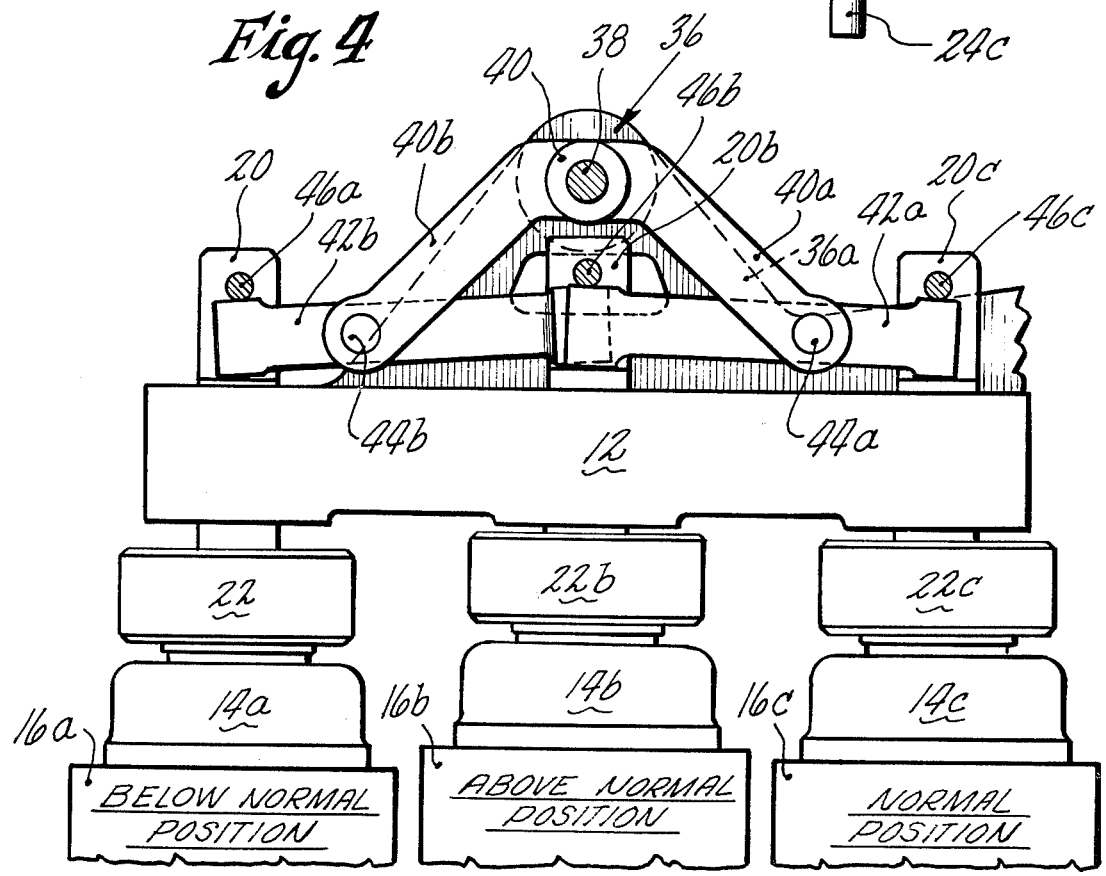

TRIPLE GOB BLOWHEAD OR BAFFLE CONSTRUCTION

BACKGROUND OF THE INVENTION

Prior art blowhead or baffle configurations for triple gob glassware forming machines have generally utilized either individual springs for each blowhead retainer, which springs are designed to urge each associated blowhead downwardly in the carrier with a preset force, or a single spring having the effect of distributing this force more equally among the three blowheads. U.S. Pat. No. 3,472,642 to Irwin shows an example of the individual spring baffle restoring force configuration, and U.S. Pat. No. Re. 27,834 to Dahms shows the single spring configuration.

In Irwin, the individual baffle supporting structure suffers from the disadvantage that there can be no equalizing force as between the three individual baffles shown. In Dahms this disadvantage is lessened, but the position of the single spring there used must be preset very precisely in order that this configuration will perform satisfactorily, that is to effectively equalize the closing forces as between the three blowheads and their associated individual molds.

The primary object of the present invention is to provide a baffle or blowhead assembly which does not rely upon either individual springs for each of the individual blowheads, nor does it require the use of a precisely prepositioned spring acting upon the blowheads or baffles collectively. In the disclosure to follow no springs are utilized, nor is there any need for the use of air springs as shown for example in Trahan U.S. Pat. No. 3,871,856.

SUMMARY OF THE INVENTION

This invention relates generally to the manufacture of glassware in a Hartford I.S. type of glassware forming machine, and deals more particularly with an improved means for mounting the individual baffles or blowheads in a carrier so that they can be mated with the individual molds of a multi-gob machine section either at the blank or blow mold stations in such a machine section. Although the drawings show a preferred embodiment of the invention as applied to the blow mold side of such a machine, the invention is not so limited, and is also adapted for use on the blank mold side of such a machine section.

In a typical such machine glass gobs are fed into the open upper ends of inverted blank molds at the blank mold station, suitable neck ring molds being associated with the lower ends of these inverted blank or parison molds, with neck pins or plungers being adapted to mold the neck or finish portion of the parison. As described in detail in the Ingle U.S. Pat. No. 1,911,119, a settle blowhead is provided on a suitable carrier or arm and is adapted to be lowered into position at the top of the funnel, which funnel guides the gob when it is initially deposited in the blank mold. A settle blowhead may be used to settle the charge into the lower portion of the blank mold, and especially into the neck ring mold itself. The settle blowhead is then raised out of position and the funnel removed, at which time the settle blowhead may again be lowered into position directly onto the blank mold. In this latter position, the settle blowhead serves as a baffle for permitting counter blowing or pressing of the parison through the lower neck ring molds, the settle blow air passageways in the settle blowhead or baffle being closed off during this latter portion of the cycle.

At the blow side of a typical glassware forming machine a blowhead carrier moves the blowheads into contact with the upper ends of the blow molds into which molds the parisons have been located in an upright configuration such that a tube can be inserted downwardly into the neck of the glassware article. The neck ring will have released the parison at the blow side such that the parison can be blown into the final desired shape of article.

Thus, a general object of the present invention is to provide an improved blowhead or baffle construction wherein the carrier supports at least three blowheads or baffles such that they are mounted for limited vertical floating movement, and to provide means between the carrier and the blowheads themselves such that the closing forces between the individual blowheads or baffles and their corresponding individual molds are equalized.

A more specific object of the present invention is to provide a blowhead or baffle construction wherein the closing force between each baffle or blowhead and its subadjacent mold is effectively substantially equalized as a result of a unique linkage arrangement which obviates the need for springs or air pistons or the like in the carrier for the blowheads or baffles.

BRIEF DESCRIPTION OF THE DRAWINGS

FIG. 3 is a side elevational view of the blowhead carrier construction depicted in FIGS. 1 and 2 with a portion of the equalizer linkage being broken away to reveal the construction of certain internal components.

FIG. 4 is a sectional view being somewhat similar to FIG. 2 and taken generally along the line 4—4 of FIG. 3 showing the blowheads in contact with associated individual blow molds at the blow mold side of a glassware forming machine section.

DETAILED DESCRIPTION

Figure 1:
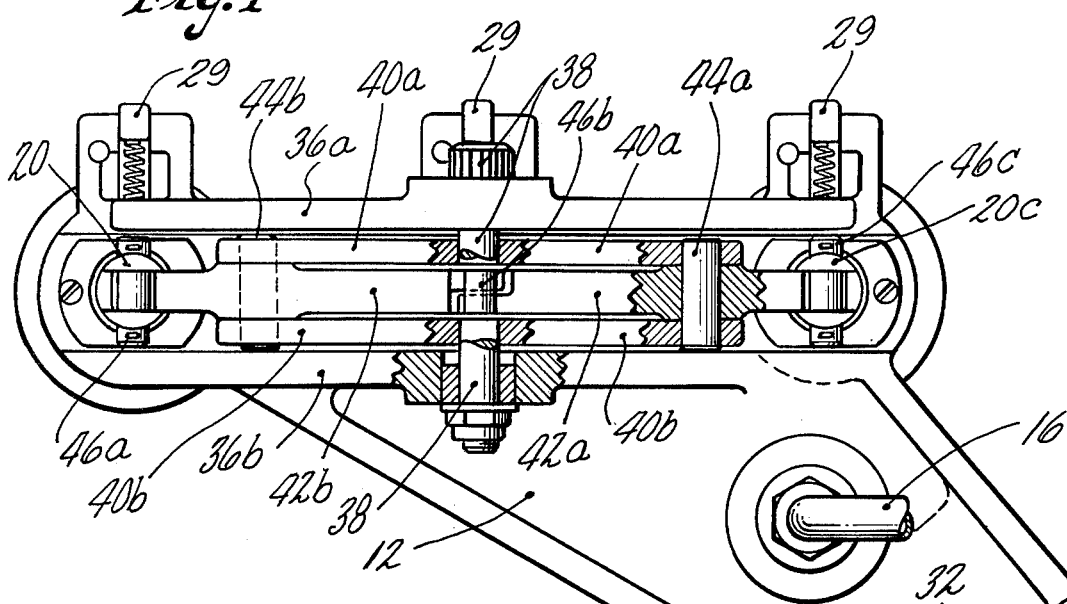
FIG. 1 is a plan view of a blowhead carrier constructed in accordance with the present invention, with portions shown in horizontal section to reveal the internal arrangement of certain parts.

Turning now to the drawings in greater detail, FIG. 1 shows a vertically disposed actuating rod 10 which is adapted to be oscillated in a conventional manner by mechanisms such as that described more completely in the above mentioned patent to Ingle U.S. Pat. No. 1,911,119 so as to cause the blowheads or baffles supported in a carrier arm 12 to move between the active position shown in FIG. 4 and an inactive position shown in FIG. 2. As shown and described in Ingle, the inactive position is spaced vertically above the active position, and may be translated or rotated therefrom at the blank side of the machine section by oscillatory motion of the rod or shaft 10. In the active position of FIG. 4 the blowheads 14a, 14b and 14c are in contact with their associated blow molds 16a, 16b and 16c respectively. In the inactive position shown in FIG. 2 on the other hand these blow molds 14a, 14b and 14c are not in contact with the blow molds of FIG. 4, but are elevated above the active position of FIG. 4 and stand in an inactive position such that all three blow heads are oriented in a common horizontal plane. Note that in FIG. 4 the three blowheads are spaced at varying vertical distances with respect to the horizontal, and conform, in these positions, to the upper surfaces of the blow mold 16a, 16b and 16.

Figure 2:
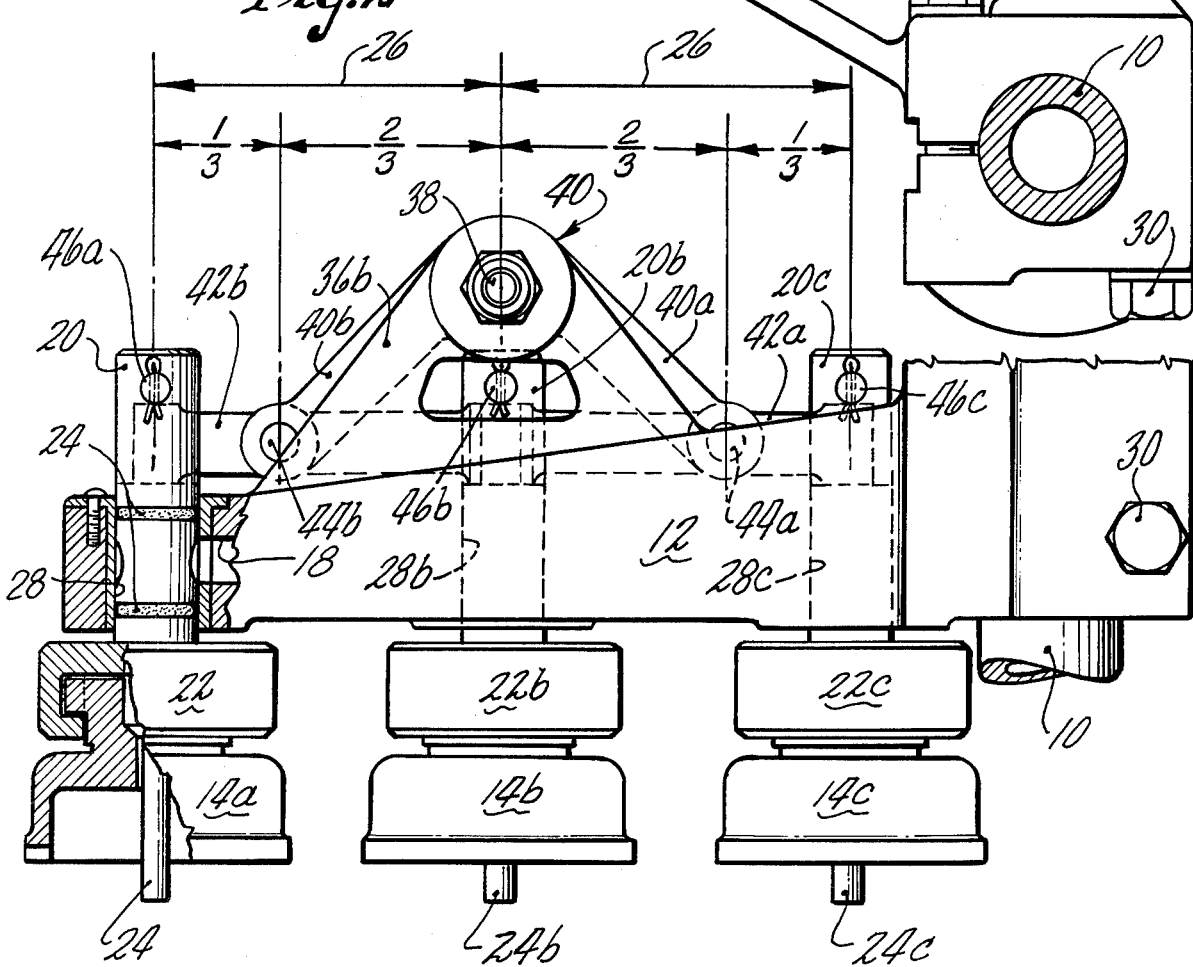
FIG. 2 is an elevational view with a portion of one blowhead and associated retainer in the carrier arm being revealed in vertical section, such arrangement being typical of the other two blowheads and retainer mechanisms.

The present invention deals with linkage means for equalizing the closing forces between three side-by-side mold closing heads through pivotal connections to two links such that the downwardly moving carrier arm 12 exerts individual forces on the three heads proportional to the linear distances between the heads and these pivotal connections. FIG. 2 shows this relationship wherein these pivotal connections are located ⅔ of the distance between the middle blowhead 14b and the two blowheads 14a and 14c on either side thereof.

The carrier arm 12 defines a hollow plenum chamber which communicates with a source of air under pressure as indicated generally by the flexible line 16 such that a source of blow air is provided in the passageway 18 to the hollow interior of post 20 associated with blowhead retainer 22 in order that blow air can be provided in the depending tube 24 which extends downwardly through an opening provided for this purpose in the blowhead 14a as best shown in FIG. 2. Each of the blowheads 14a, 14b and 14c is similarly provided with a passageway such as shown at 18 which communicates with the plenum defined within the carrier 12 in order to provide blow air to each of these blowheads in accordance with a predetermined timing program preset in the glassware forming machine such that air under pressure is cyclically provided to these blowheads when the blowheads mate with their associated blow molds as shown in FIG. 4.

The tube 24 may comprise a hollow threaded member which is removably received in the lower portion of the post 20. The post 20 comprises an integral part of the retaining means 22 or holder which supports the blowhead 14a. Each of the other blowheads 14b and 14c is similarly supported in the carrier 12, and more particularly is held in an associated retainer 22b and 22c respectively with each of these retainers having upstanding post portions 20b and 20c which portions include hollow intermediate portions defining an opening for providing a passageway for the flow of air under pressure from a passageway such as that at 18. Each post 20, 20b and 20c further includes piston rings as indicated generally at 24 in FIG. 2 in order to seal the air under pressure with respect to the vertical bore extending through the carrier 12 for the post portion 20 of the retainer or holder for the blowheads.

The three blowhead retainers are equally spaced in side-by-side relationship in the carrier arm 12 as shown in FIGS. 1 and 2, the distance between adjacent post portions 20, 20b and 20c being indicated schematically in FIG. 2 at 26. Thus, each retainer 22 and its associated post 20 are slidably received in openings 28, 28b and 28c in the carrier 12 such that each is free to move vertically except as such motion is restricted by the equalizer linkage to be described. Rotation of these retainers is prevented (selectively) by conventional devices as shown at 29 in FIGS. 1 and 3.

Turning now to FIG. 3, the vertically reciprocating post 10 is there shown with the carrier arm 12 secured thereto, as for example by fasteners 30, 32 and 34. FIG. 3 also shows the carrier arm 12 as having integrally defined upstanding web means 36 in the form of flanges 36a and 36b which web means or flanges are generally triangular in configuration as best shown in FIG. 4 in order to support pivot shaft 38, which shaft 38 extends across and between the flanges 36a and 36b in a direction oriented transversely or perpendicularly with respect to the line of the three side-by-side blowheads referred to previously.

The pivot shaft 38 forms a pivot means for equalizer bellcrank 40, which bellcrank has depending arms 40a and 40 b, the lower ends of each of which arms are bifurated to receive an intermediate portion of one of two links 42a and 42b as best shown in FIG. 4. Pivot pins 44a and 44b extend across and between the furcations of the lower ends of the arms of the bellcrank 40 in order to pivotally connect the arms of the bellcrank 40 to each of the links 42a and 42b respectively.

With particular reference to FIG. 4, each of the links 42a and 42b has a length slightly greater than the distance between adjacent posts 20, 20b and 20c as referred to previously with respect to FIG. 2 at reference No. 26. The inner end portions of these links 42a and 42b are located adjacent to one another at the middle post 20b, both said adjacent ends of the links 42a and 42b being more particularly located in a radially extending slot in post 20b defined by its bifurated upper end portion and the pin 46a and 46b respectively. Each link 42a and 42b also has opposite ends located in a slot of one of the other two mold closing head retainer post portions 20 and 20c respectively. These post portions of blowhead retainers 22 and 22c also have bifurcated upper end portions as best shown in FIG. 3, so that a pin such as shown at 46c in that view is adapted to cooperate with the furcations at the upper end of the posts to define the above mentioned slots for loosely receiving the outer ends of links 42a and 42b.

As so constructed and arranged, closing movement of the carrier 12 with reference to the blow molds 16a, 16b and 16c will result in relative vertical movement of each of the three retainers 22, 22b and 22c such that each moves vertically with its associated post portion sliding axially in the bore provided for this purpose in the carrier and causing relative motion of the equalizer linkage and more particularly of the links 42a and 42b as well as movement of the associated bellcrank 40 in order to provide a convenient means for accommodating differences in height between the upper ends of each of the above mentioned blow molds, and also providing equalization of the closing force between the blowheads 14a, 14b and 14c as these blowheads move against their associated molds. The pivotal connection between each of the arms 40a and 40b of the bellcrank 40 and the associated links 42a and 42b respectively is preferably chosen such that the horizontal distance between the center line of the post 20 and the center line of the adjacent post 20b (see reference numeral 26 of FIG. 2), is preferably one-third of the distance therebetween as shown in this view. Stated differently, the distance from the middle post portion 20b of retainer 22b to each of the adjacent other two post portions 20 and 20c respectively is such that the pivotal connection defined by pins 44a and 44b is chosen to be two-thirds the distance 26 in FIG. 2. This particular geometry assures that the equilization force achieved in response to closing movement of the carrier 12 as suggested in FIG. 4 will result in substantial equalization of the closing forces between the blowhead and its associated mold without need for spring or the like as is characteristic of prior art baffle or blowhead constructions generally.

I claim:

1. In a glassware forming machine having at least one section including three side-by-side upwardly open molds which are closed by mold closing heads, a carrier adapted for movement toward and away from the upwardly open side-by-side molds, and three mold closing head retainers mounted in said carrier the improvement comprising:

each mold closing head retainer mounted for limited vertical movement in said carrier;

two links each of which has a first end engaging the middle of the three side-by-side mold closing head retainers, with the second end of one of said links engaging one of the other two mold closing head retainers and the second end of the other link engaging the other of the other two mold closing head retainers; and linkage means pivotally connected to said carrier and having opposite ends thereof pivotally connected to each of the two links intermediate the ends thereof whereby as the three mold closing heads are moved into registration with their respective openings the closing forces exerted on the molds tend to be equalized.

2. The combination defined in claim 1 wherein said linkage means more particularly comprises a bellcrank pivotally mounted in said carrier above said middle mold closing head retainer, said bellcrank having two arms, and each said arm being pivotally connected to one of said two links at a point intermediate the ends of each of said links.

3. The combination defined in claim 2 wherein said carrier defines internal air passageways, and wherein said mold closing head retainers also define internal passageways communicating with said carrier air passageways whereby air is available to said mold closing heads.

4. The combination defined in claim 2 wherein said carrier defines upstanding web means with a boss adapted to receive a pivot pin for supporting said bellcrank above said middle mold closing head for pivotal movement as aforesaid.

5. The combination defined in claim 4 wherein said arms of said bellcrank have bifurcated end portions for receiving intermediate portions of each of said two links, and pivot pins extending through the furcations and through said intermediate portions of each of said links, said pivotal connection between each link and its associated bellcrank arm being at a point at least approximately two-thirds of the center distance between the middle mold closing head retainer and one of the other two mold closing head retainers.

6. The combination defined in claim 1 wherein each mold closing head retainer has an upstanding post portion slidably received in said carrier for limited vertical movement of said retainer as aforesaid.

7. The combination defined in claim 6 wherein each post portion defines a radially open slot for receiving the end of at least one of said two links, said middle post portion slot receiving the ends of both said two links which ends are adjacent to one another, said slots being so defined as to permit limited pivotal movement of said links to equalize the closing forces as aforesaid.

* * * * *